United States Patent [19]
Farrell et al.

[11] Patent Number: 4,848,708
[45] Date of Patent: Jul. 18, 1989

[54] ADJUSTABLE ASSEMBLY FOR AIRCRAFT RUDDER, BRAKE AND NOSE LANDING GEAR STEERING CONTROL

[75] Inventors: Gerald T. Farrell, Bellevue; Seiya Sakurai, Seattle, both of Wash.

[73] Assignee: The Boeing Company, Seattle, Wash.

[21] Appl. No.: 120,324

[22] Filed: Nov. 13, 1987

[51] Int. Cl.4 ............................................ B64C 13/06
[52] U.S. Cl. .................................................... 244/235
[58] Field of Search ............... 244/235; 74/478, 478.5, 74/512

[56] References Cited

U.S. PATENT DOCUMENTS

| | | | |
|---|---|---|---|
| 1,462,531 | 7/1923 | Baumann | 244/235 |
| 1,746,008 | 2/1930 | Minshall | 244/235 |
| 1,774,558 | 9/1930 | Laddon et al. | 244/111 |
| 1,795,910 | 3/1931 | Wait, Jr. | 244/111 |
| 1,814,576 | 7/1931 | Tatter | 244/235 |
| 1,873,906 | 8/1932 | Ring et al. | 244/235 |
| 1,884,701 | 10/1932 | Howard | 244/111 |
| 1,919,520 | 7/1933 | Laddon et al. | 244/111 |
| 1,998,677 | 4/1935 | Laddon et al. | 244/29 |
| 2,048,448 | 7/1936 | Hofer | 244/29 |
| 2,074,730 | 3/1937 | Kerr, Jr. | 244/86 |
| 2,424,523 | 7/1947 | Watter | 244/86 |
| 2,433,146 | 12/1947 | Odell, Jr. | 244/86 |
| 2,516,397 | 7/1950 | Kress et al. | 74/478 |
| 2,585,688 | 2/1952 | Saulnier | 244/235 |
| 2,610,006 | 9/1952 | Boyce | 244/86 |
| 3,377,881 | 4/1968 | Lucas | 74/512 |
| 4,470,570 | 9/1984 | Sakurai et al. | 244/235 |

FOREIGN PATENT DOCUMENTS 244760  9/1946  Switzerland ........................ 244/235

Primary Examiner—Sherman D. Basinger
Assistant Examiner—Rodney Corl
Attorney, Agent, or Firm—Bruce A. Kaser

[57] ABSTRACT

A rudder, brake and nose landing gear steering control assembly for an aircraft provides adjustable positioning of the assembly's control pedals relative to the pilot. Pedal adjustment is accomplished by pivoting the entire assembly, which includes pivoting an assembly frame and pedals, and linkage structure carried by the frame. The pedals are moved either nearer or farther to and from a pilot, depending on the length of the pilot's legs.

1 Claim, 12 Drawing Sheets

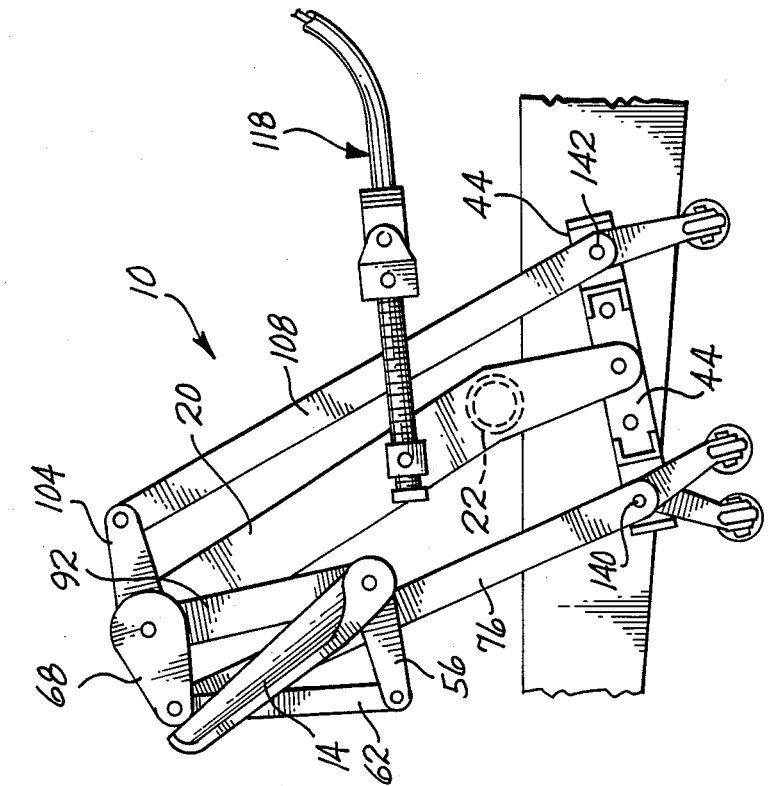
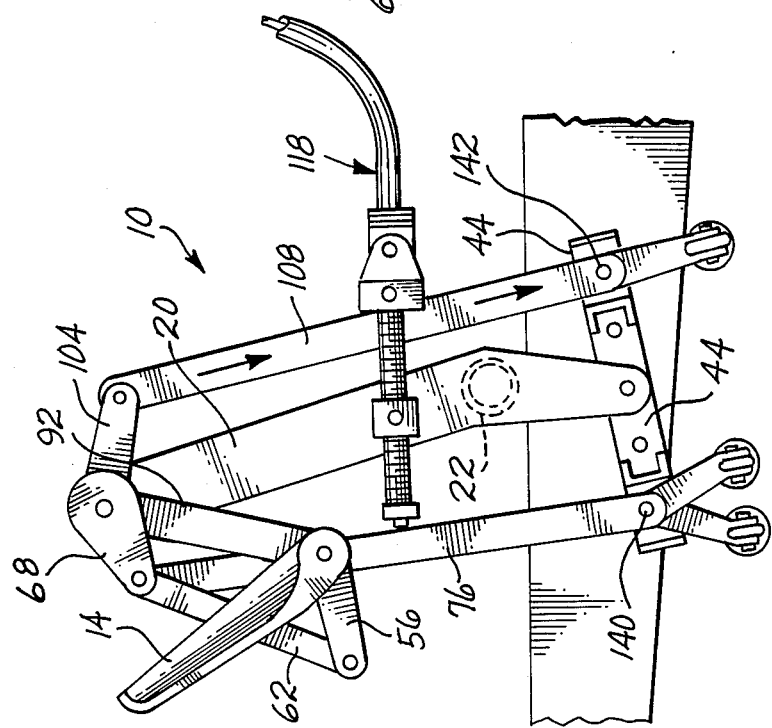

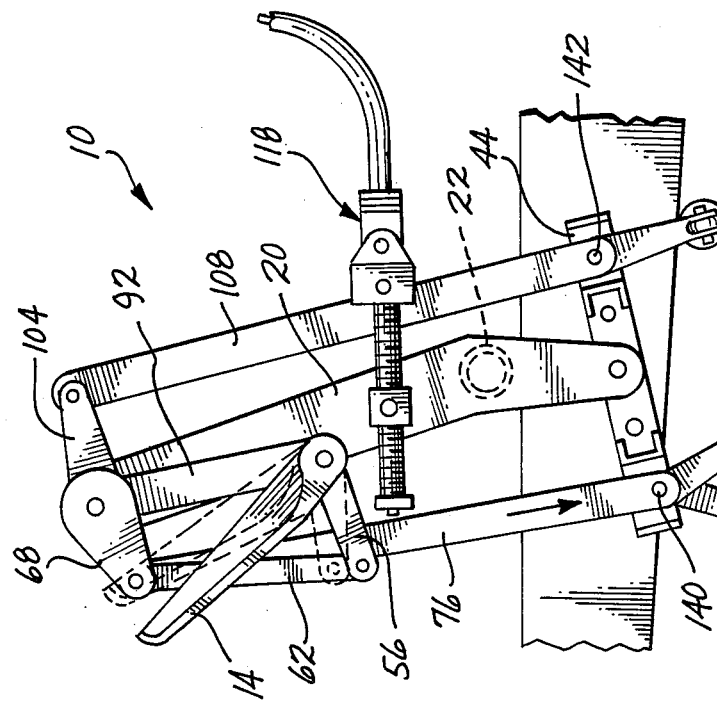
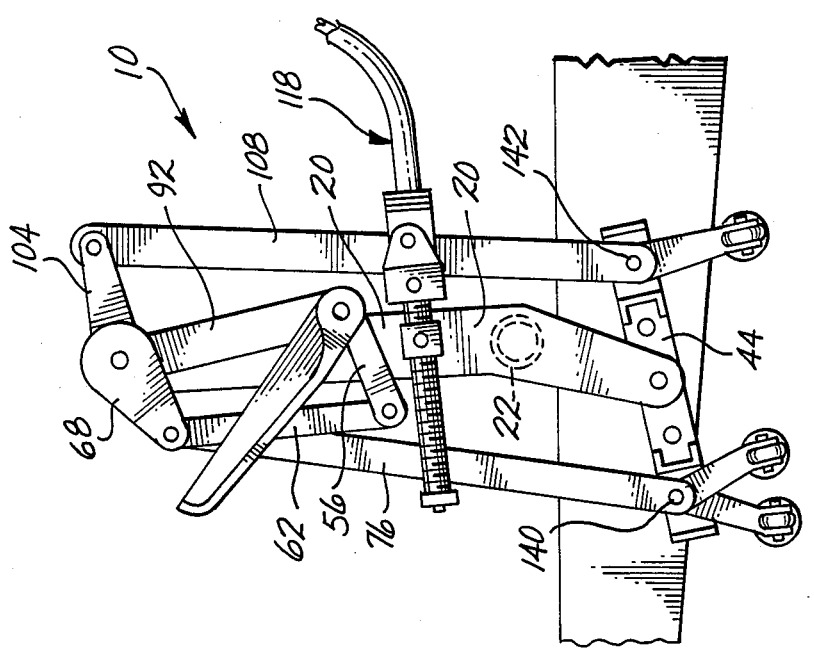

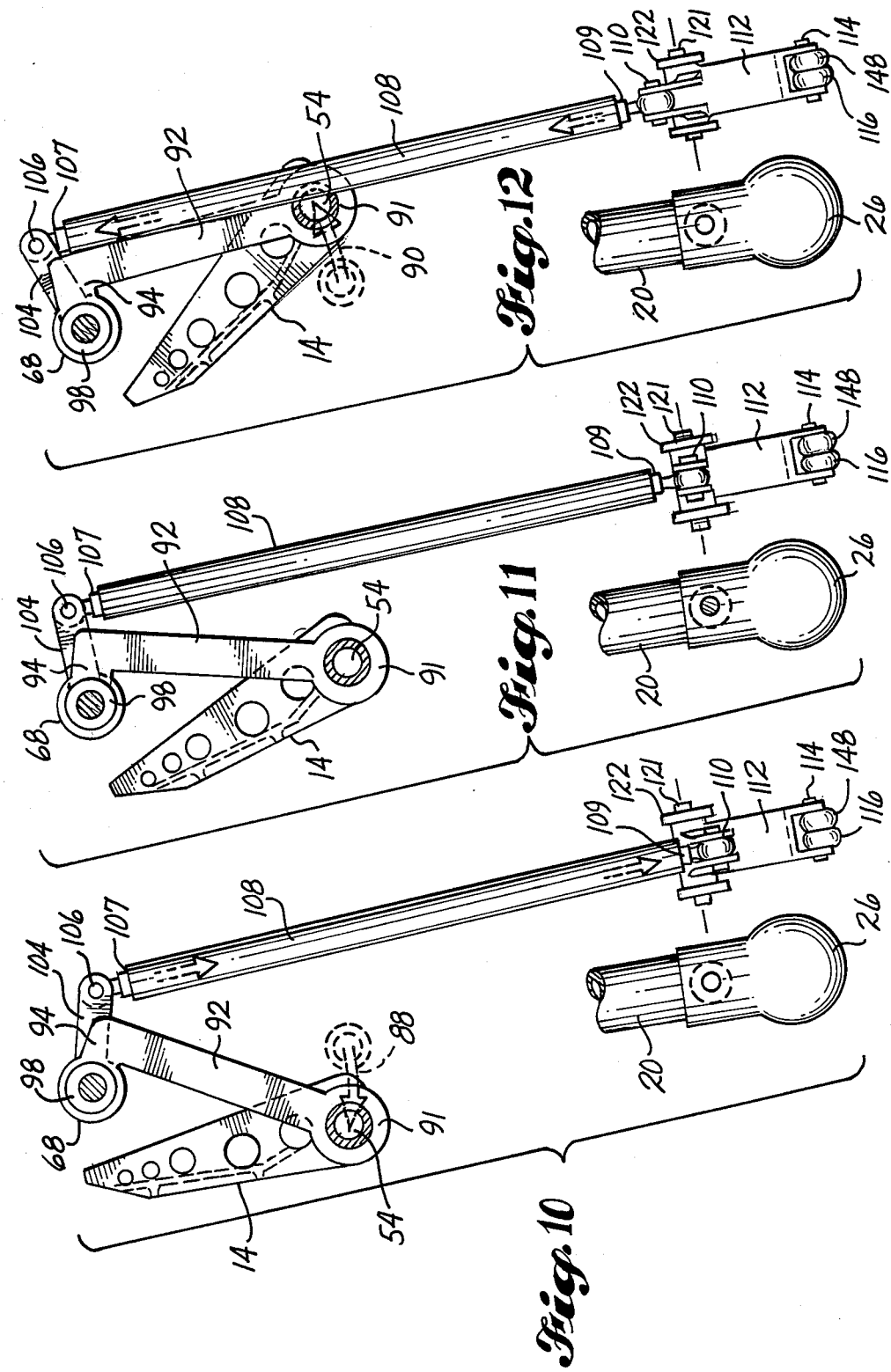

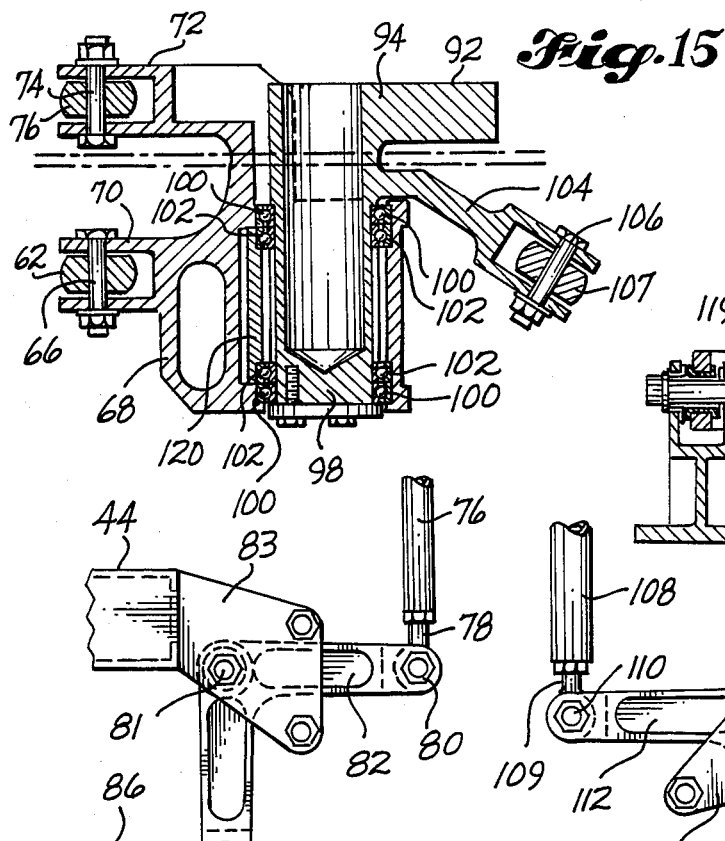
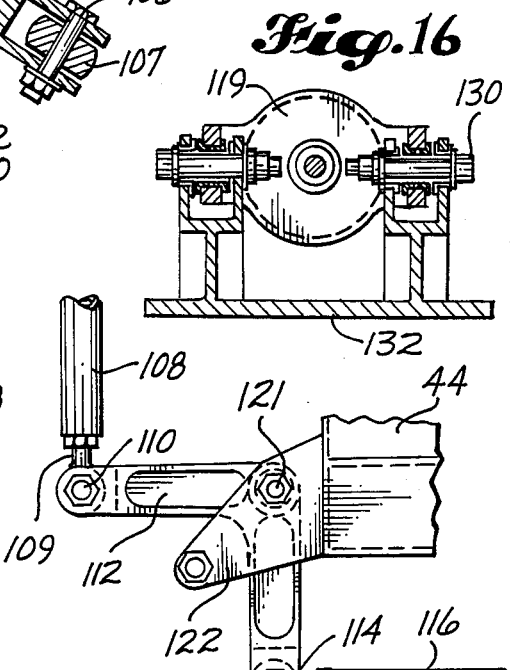
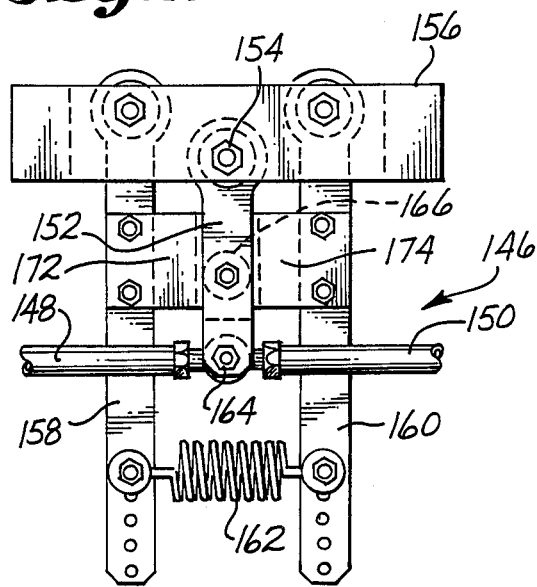

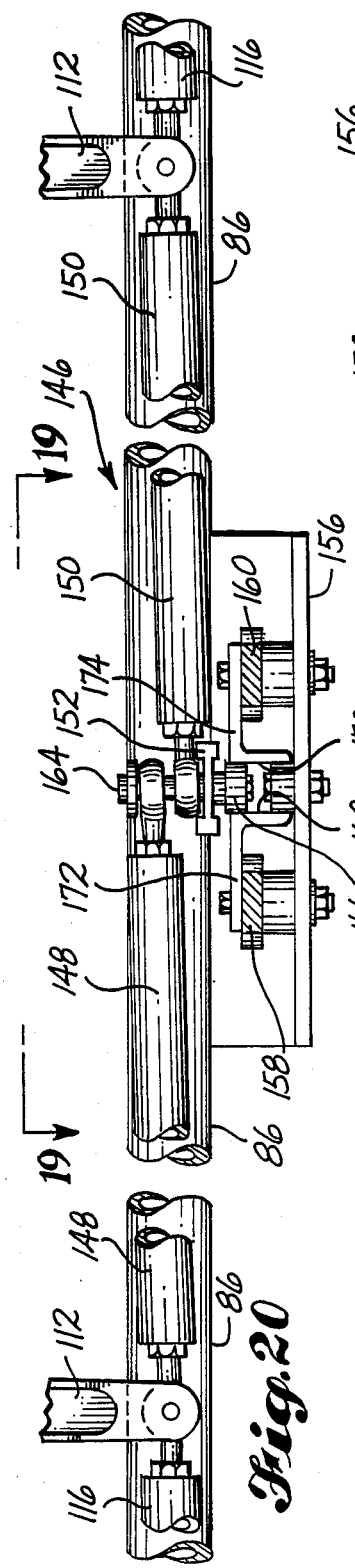
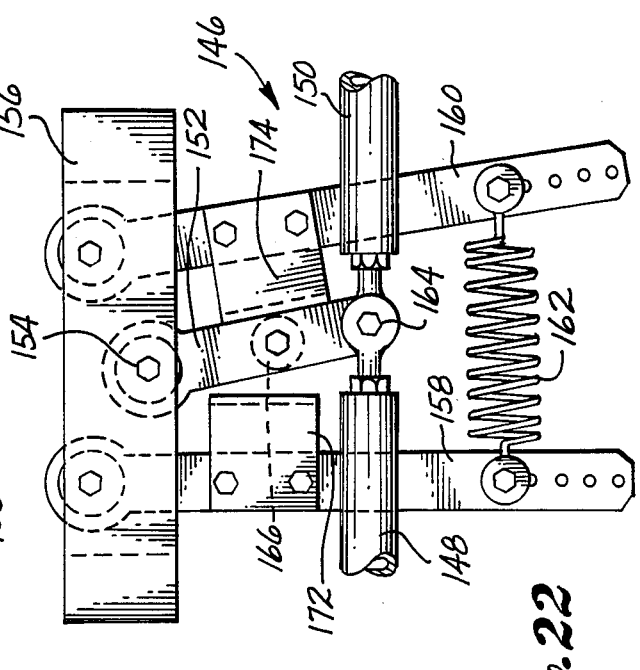
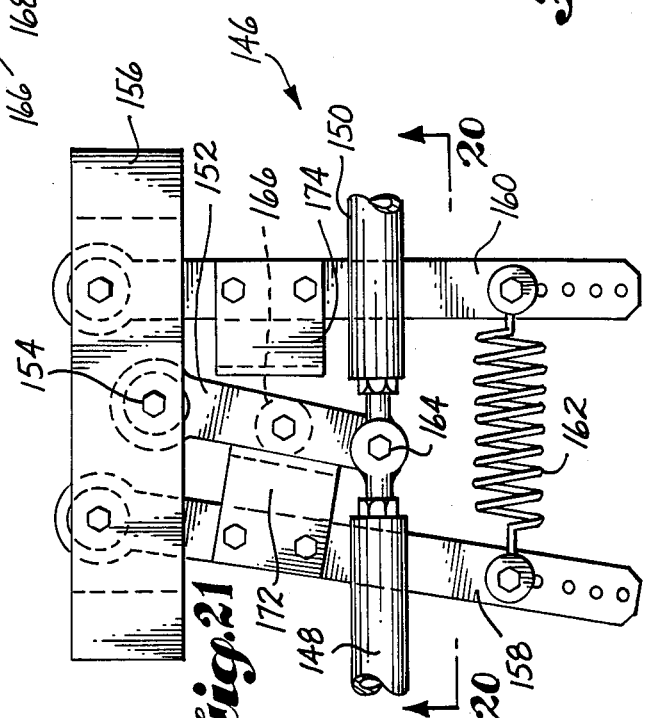

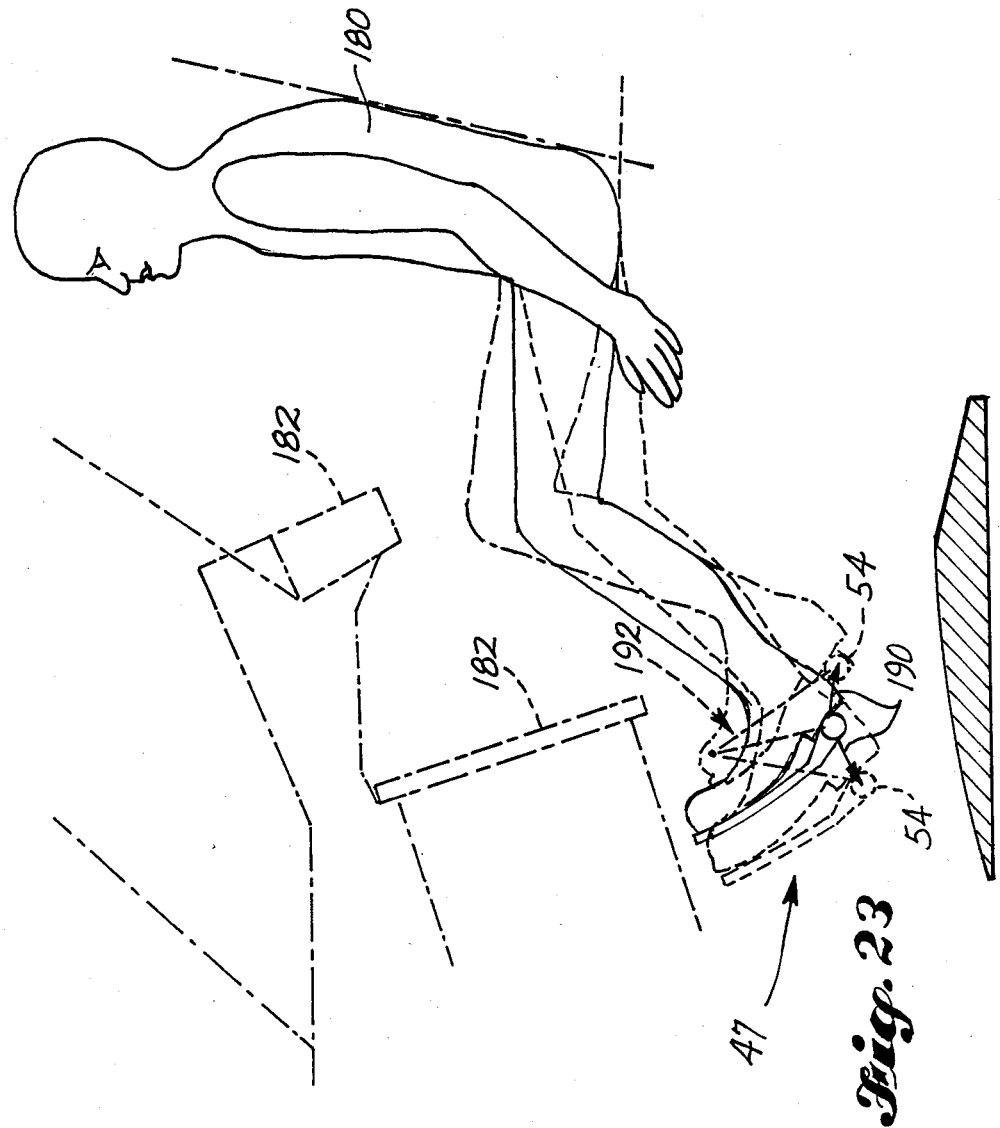

ADJUSTABLE ASSEMBLY FOR AIRCRAFT RUDDER, BRAKE AND NOSE LANDING GEAR STEERING CONTROL

TECHNICAL FIELD

This invention generally relates to foot-operated controls for vehicles, and more particularly, to cockpit-mounted pedals for rudder, brake and nose landing gear steering control in aircraft.

BACKGROUND ART

This invention was developed in response to a human factors study which sought a rudder pedal mechanism that could give the correct pedal angle for all pilots. Current rudder pedal designs use governmental guidelines such as AFSC DH2-2, DN2A1, SUBNOTE 1(1) or 1(4); MS33574; MS33576; or MIL-STD-1333. Designs based on these specs result in incorrect pedal angles, mostly because the human factors data we have today was not available when those specs were written. Human limb length and limb rotation limitations are well documented now, and this documentation was used in developing this mechanism.

Foot-operated pedals for aircraft rudder, brake and nose landing gear steering control are familiar and well-known in the art. Operation of these devices can generally be described in that pedal rotation is used for brake control, and pedal displacement is used for both rudder and nose landing gear steering control. Over the years, many patents have issued on various pedal designs, the most pertinent of which, at least with regard to the present invention, are: U.S. Pat. No. 2,424,523 issued to Watter on July 22, 1947; U.S. Pat. No. 3,377,881 issued to Lucas on Apr. 16, 1968; and U.S. Pat. No. 2,516,397 issued to Kress et al. on July 25, 1950.

A typical defect in many past designs, and which is addressed to a certain degree in the Lucas and Kress patents, is the failure to provide a means for adjusting normal pedal fore and aft position, as well as pedal surface angles so that they can be made comfortably reachable for operation by pilots of different stature. For example, for reasons stated above, those designs currently used in the commercial aircraft field do not fully address the limitations of human reach and movement. Although the typical design makes rudder pedal throw without brake application well within the capability of people of one stature, people of another stature tend to experience discomfort when performing this movement.

Although the present invention has many advantages, which will be discussed more fully below, the invention addresses the above defect by providing a pedal-operated control device that is comfortably operable by nearly all pilots. In accomplishing this, the invention provides a pedal design that permits pedal operation within the constraints of minimum human limb rotation angles and permits adjustment of pedal position according to the individual needs of each pilot.

DISCLOSURE OF THE INVENTION

The control device disclosed herein is an assembly that is installable or positionable generally forwardly of a conventional pilot's seat and underneath a conventional control panel in a cockpit. The assembly includes a pair of foot-operated pedals and linkage means or structure for operationally connecting operation of the pedals to the control of aircraft brakes, rudders and nose landing gear steering. Pilot operated pedal movement is in accordance with conventional practice in the art, i.e. pedal rotation is used for brake operation and pushing or displacing the pedal, i.e. pedal "throw", permits rudder and nose landing gear steering control.

The assembly is pivotally mounted to a fixed support in the cockpit so that the entire assembly, including both its pedals and pedal linkage structure, is pivotable about a substantially horizontal axis. Pivoting the assembly changes the normal non-operated position of the pedals and linkage structure relative to the pilot's seat, and is thus usable to adjust fore and aft pedal position so that they are comfortably reachable by pilots of various stature.

Preferably, the assembly includes a "U"-shaped frame with two upwardly extending side legs that are interconnected at their bottoms by a transversely extending leg. One pedal eac is mounted on an inward side of each side leg, in a manner so that each pedal can be pushed and rotated as need be for rudder, brake and/or nose gear steering control. The above-mentioned horizontal axis about which the entire assembly pivots is positioned in generally parallel fashion to the transversely extending leg of the "U" frame, but is offset therefrom a certain distance. A means for providing assembly pivotal adjustment is preferably in the form of a hand-operated jack-screw assembly, which is connected to the transverse leg at a location that is substantially centrally between the upwardly extending side legs of the frame.

Human factors research has revealed a wealth of useful data pertaining to human joints motion. This data can be used to provide minimums, maximums and average angles between hip, upper and lower leg and foot limbs at the extremes of limb movement. Using this data, it has become known that if rudder and brake pedals are designed for limb movement capability of the average human being, then 50% of all pilots would experience some discomfort when operating the pedals. On the other hand, if minimum human limb rotation angles are all that are required to operate pedals, then approximately 95% of all pilots would be provided comfortable pedal operation. Accordingly, the present invention provides a rudder, nose gear steering and brake pedal assembly designed with human factors research in mind. In this regard, it permits a pilot to regulate brakes regardless of rudder pedal throw position, and vice versa, and he is able to do so no matter whether his heel or instep is on the rudder pedal fulcrum. Further, he is able to operate the rudder with his heels resting on the heel rest plane and his toes or the ball of his foot on the pedal fulcrum. The pedal clears the heel rest plane sufficiently to prevent danger of heel entrapment. Also, the heel rest plane is located in a comfortable position for the pilot to rest his legs and yet feel the aircraft when it is flying on autopilot.

An advantage of the present invention, therefore, is that is provides pedal adjustment and operational motions that are believed to be biomechanically superior to other similar assemblies designed to date. A related advantage is that the invention provides more space for pilot leg room.

Another advantage to the invention is that it provides substantial weight and cost savings because it is simple in design, reduced in size, and requires only simple structural attachments for mounting the entire assembly in the cockpit. Not only does this mean cost savings with respect to manufacturing the assembly, but also cost savings in installation. Formerly, control assemblies of this type have been built into the cockpit piece-by-piece. In comparison, the present assembly is buildable outside the aircraft as a single unit, and can then be installed in the cockpit as a unit.

These advantages, and others, will become more apparent and better understood upon reading the following description in conjunction with the drawings.

BRIEF DESCRIPTION OF THE DRAWINGS

In the drawings, like reference numerals and letters refer to like parts throughout the various views, and wherein:

FIG. 4 is a view like FIG. 2, but shows the assembly adjusted in a middle position for operation by a pilot of average stature, and further shows an assembly pedal "thrown" forwardly for rudder operation;

FIG. 5 is a view like FIG. 4 but shows the assembly pivoted forwardly for use by a pilot of tall stature, and shows the rudder throw position in a neutral position;

FIG. 8 is a view like FIG. 5, but shows the assembly pivoted rearwardly for comfortable use by a pilot of short stature;

FIG. 9 is a view like FIGS. 4, 6 and 7, but shows pivotal movement of the pedal for brake operation;

FIG. 10 is an end view like FIGS. 2 and 6-9, but shows only pertinent assembly linkage structure for illustrating how the assembly's foot pedals are moved or thrown during a rudder control operation;

FIG. 11 is a view like FIG. 10, but shows a neutral pedal throw position;

FIG. 12 is a view like FIGS. 10 and 11 but shows the rudder pedal thrown aft.

FIG. 15 is a cross-sectional view taken along line 15—15 in FIG. 1, and shows mounting structure which provides the means for connecting the assembly's foot pedals to its frame;

FIG. 16 is a cross-sectional view taken along line 16—16 in FIG. 2, and shows a conventional manually operated jack screw mechanism for pivoting the assembly in the manner shown in FIGS. 5, 6 and 8;

FIG. 17 is a side view of a bell crank arm and is taken along line 17—17 in FIG. 2;

FIG. 18 is a side view of another bell crank arm and is taken along line 18—18 in FIG. 2;

FIG. 19 is a top plan view of a rudder feel and centering unit that is used to operationally interconnect one assembly, like the assembly shown in FIG. 1, with another, and is taken along line 19—19 in FIG. 20;

FIG. 20 is a side elevational view of the feel and centering unit shown in FIG. 19, and is taken along line 20—20 in FIG. 10;

FIG. 21 is a view like FIG. 19 but shows a displacement action in the feel and centering unit corresponding to operation of assembly foot pedals for rudder control;

FIG. 22 is a view like FIG. 21 but shows displacement action in another direction in response to reversed operation of assembly foot pedals;

FIG. 23 is a schematic view of an aircraft pilot sitting in a conventional cockpit having a conventional control panel, and further schematically shows the position of the assembly's foot pedals below the control panel.

BEST MODE FOR CARRYING OUT THE INVENTION

Figure 1:
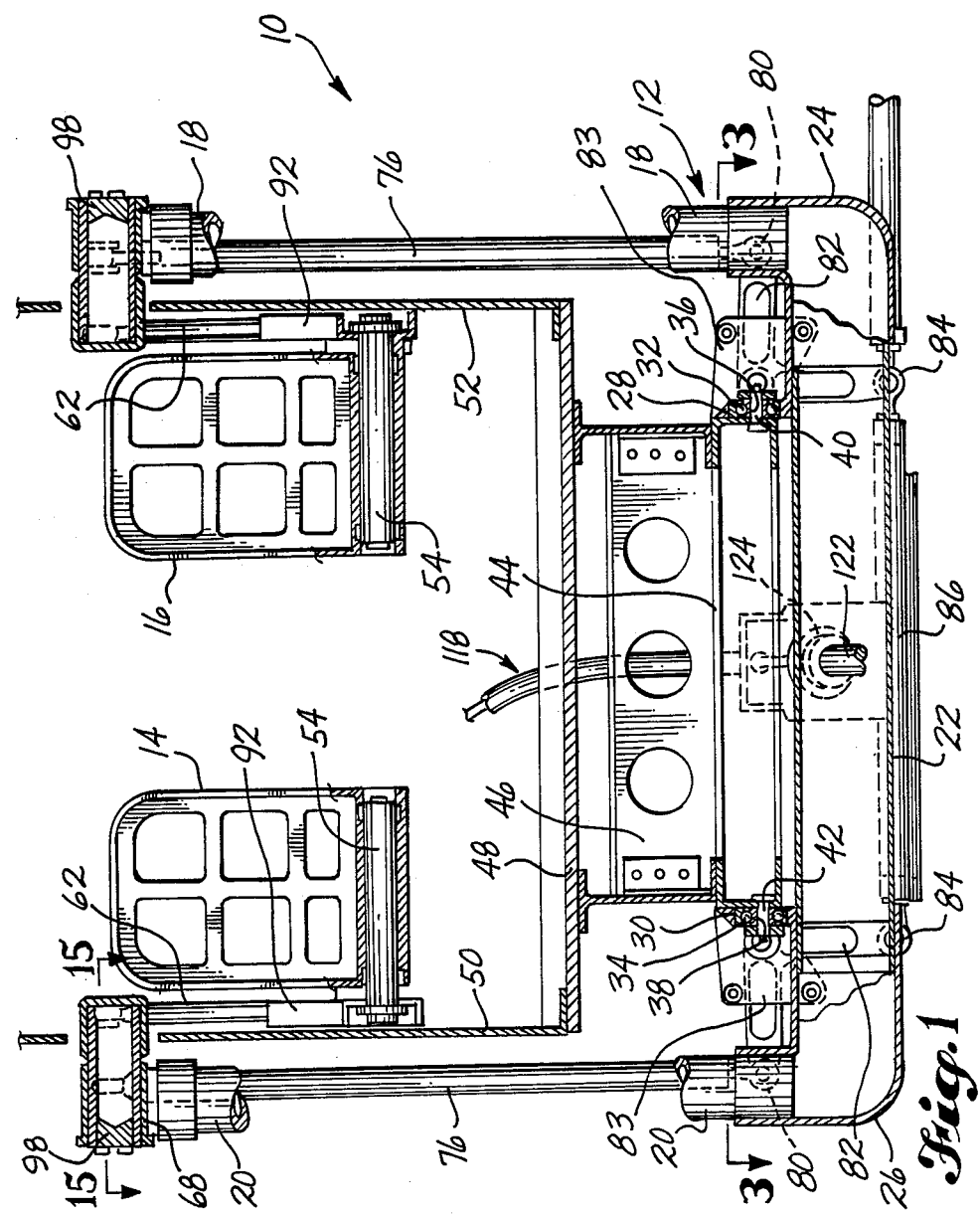
FIG. 1 is a frontal view, in partial section, of a rudder and brake control assembly constructed in accordance with a preferred embodiment of the invention, and is taken looking forwardly along the floor of an aircraft cockpit.

Referring now to the drawings, and first to FIG. 1, therein is shown at 10 a rudder and brake control assembly constructed in accordance with a preferred embodiment of the invention. Briefly, the assembly 10 includes a "U"-shaped frame, indicated generally at 12, to which is mounted a pair of foot pedals 14, 16 and rudder and brake control linkage structure, which will be described later. The frame's general construction and the means by which the assembly 10 is mounted in an aircraft cockpit will first be described.

The frame 12 is substantially made of two upwardly extending tubular side legs 18, 20 which are interconnected by a transversely extending tubular leg 22. The upwardly extending side legs 18, 20 are connected to the transverse leg 22 by a pair of conventional elbow sections 24, 26. Connected to each respective elbow section is an upwardly extending knuckle portion 28, 30 in which is received a bearing 32, 34. Extending through bores 36, 38, one in each knuckle portion 28, 30, are a pair of pins 40, 42 which are fixedly connected to an assembly mounting plate 44. The frame's knuckle portions 28, 30 and the pins 40, 42 define a horizontal axis which permits the frame, and pedals and linkage structure carried thereby, to pivot relative to the assembly mounting plate 44. The mounting plate 44 is fixedly connected to cockpit floor structure which is generally indicated at 46, 48, in FIG. 1. Extending upwardly from this structure are cover plates 50, 52 which define a pilot leg well. The position of the assembly below a control panel in an aircraft cockpit is generally indicated by arrow 47 in FIG. 23.

Directing attention now to both FIGS. 1, 2 and 15, the means by which the foot pedals 14, 16 are connected to the frame 12 will now be described. Referring to the pedal 14 on the left-hand side of FIG. 1, each pedal 14, 16 is pivotable about a pin 54 which defines the rudder pedal fulcrum. The pin 54 is fixedly connected to the lower end 91 of a pedal swing arm 92 (see FIGS. 10-12). The swing arm's upper end 94 is also fixedly connected to a casing 98 (see FIG. 15). This casing 98 is pivotally mounted by means of bearings 102 to the upper end 120 of each side leg 18, 20. In this manner, each pedal 14, 16 is supported by its respective side leg 18, 20.

Figure 14:
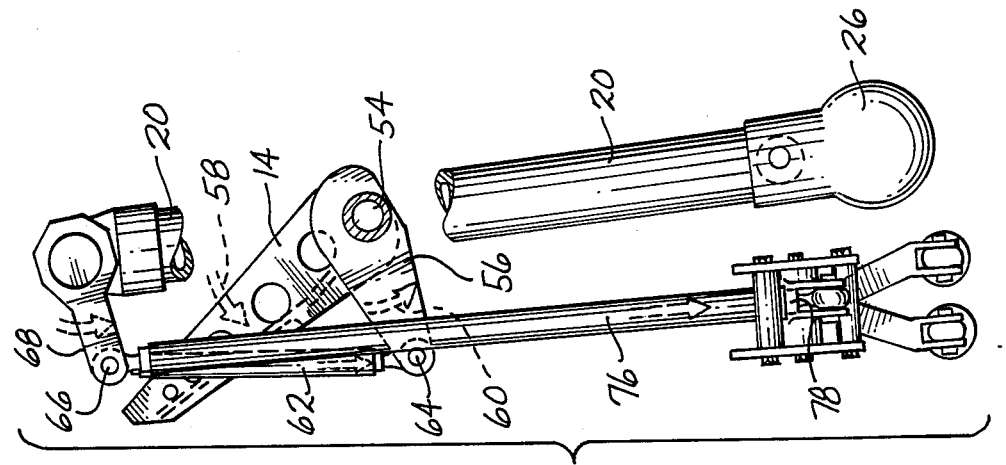
FIG. 14 is a view like FIGS. 9 and 13 but shows foot pedal rotation for aircraft braking control.
Figure 13:
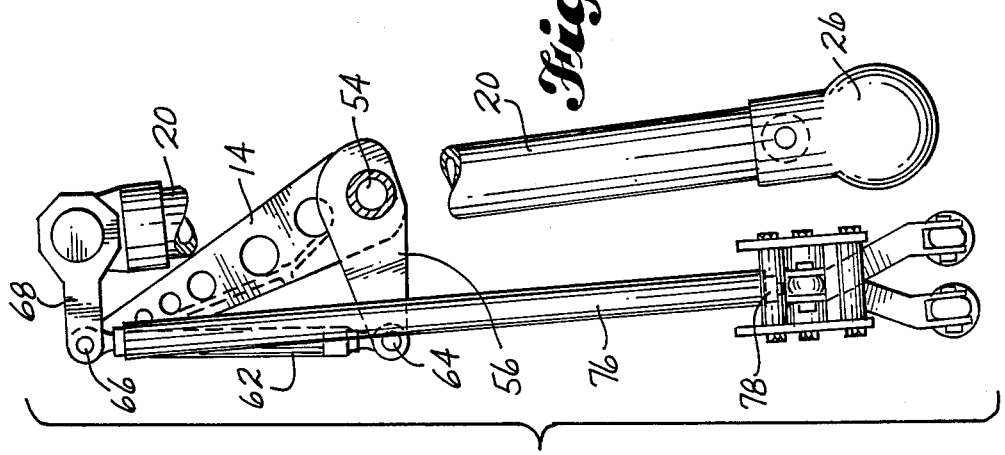
FIG. 13 is a view similar to FIGS. 10-12, but shows only pertinent assembly linkage structure for illustrating how the assembly's pedals control aircraft braking.

The body of each pedal 14, 16, although rotatable about pin 54 for brake adjustment, is fixedly connected to a load transfer arm, indicated at 56 in FIGS. 13 and 14. Rotation of the pedal 14 by a pilot's foot, as schematically indicated by arrow 58 in FIG. 14, causes the load transfer arm 56 to similarly rotate downwardly in the direction indicated by arrow 60. This further pulls downwardly a swing control rod 62 whose lower end is pivotally connected at 64 to the load transfer arm 56, and whose upper end is pivotally connected at 66 to another or upper load transfer arm shown generally at 68. The wing control rod 62 further pulls this latter load transfer arm 68 downwardly.

Directing attention again to FIG. 15, therein is shown a cross sectional view of the upper load transfer arm 68. The arm 68 is rotationally connected to the previously described casing 98 by means of bearings 100. These bearings 100 permit the arm 68 to pivot in the above manner. The arm 68 has one forwardly extending portion 70 pivotally connected at 66 to the swing control rod 62, and another forwardly projecting portion 72 pivotally connected at 74 to another downwardly extending arm or brake control rod 76. The brake control rod 76 is best seen in FIGS. 13 and 14. The lower end 78 of this rod is pivotally connected at 80 to a bell crank arm 82 (see FIG. 17). The bell crank arm is also pivotally connected at 81 to a bracket 83 that is further connected to the assembly mounting plate 44. Pivotally connected to the crank 82 at 84 is a brake control rod 86. Thus, rotation of the pedal 14, as indicated in FIG. 14, causes the above-described linkage structure to drive the brake control rod 86.

Referring to FIGS. 10-12, the means by which the pedals 14, 16 are operated for rudder control will now be described. Rudder control is accomplished by "throwing" at least one of the pedals 14 or 16 forward in the direction indicated by arrow 88 in FIG. 10. At the same time the other pedal in the assembly is "thrown" aft in the opposite direction by interconnecting linkage yet to be described. This type of rudder/pedal operation has been a conventional mode of operation in aircraft controls for quite some time and should be familiar to a person skilled in the art.

Pushing the pedal 14 as shown in FIG. 10 causes rotation of the above-described swing arm 92. The upper part 94 of the swing arm 92 is fixedly connected to the casing 98 (FIG. 15) which also has connected thereto a rearwardly projecting load transfer arm 104 (FIG. 15). This latter arm is pivotally connected at 106 to the upper end 107 of a downwardly extending push-/pull control rod 108 (see FIGS. 10-12). Thus, pushing the pedal 14 rotates the swing arm 92 which, in turn, rotates the load transfer arm 104 and pushes control rod 108 downwardly. The lower end 109 of the control rod 108 is pivotally connected at 110 to another bell crank arm 112 (see FIG. 18). As with the bell crank 82 shown in FIG. 17, this latter bell crank 112 is pivotally connected at 121 to a bracket 122 that is connected to the assembly mounting plate 44. Downward movement of the control rod 108 turns the bell crank arm 112 which is also pivotally connected at 114 to a rudder actuating tie rod 116. The tie rod 116 is connected to an aircraft rudder and interconnects one bell crank 112 on one side of the "U"-frame with another bell crank 112 on the other side (see FIG. 24) so that when one of the pedals 14, 16 is thrown in the direction indicated by arrow 88 in FIG. 10 the other pedal is thrown aft as indicated at 90 in FIG. 12.

Figure 2:
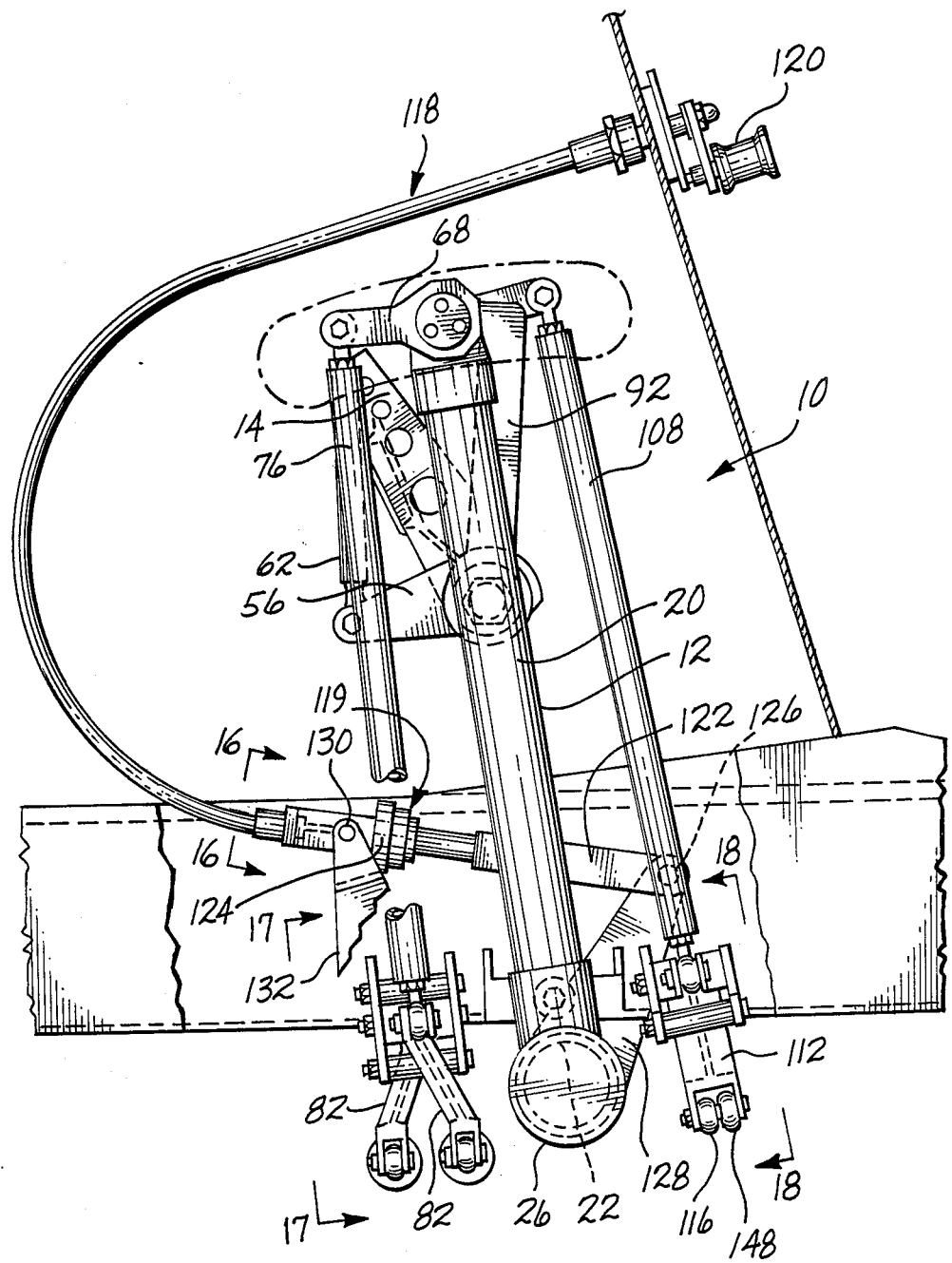
FIG. 2 is an elevational view of the left end or side of the assembly shown in FIG. 1.
Figure 3:
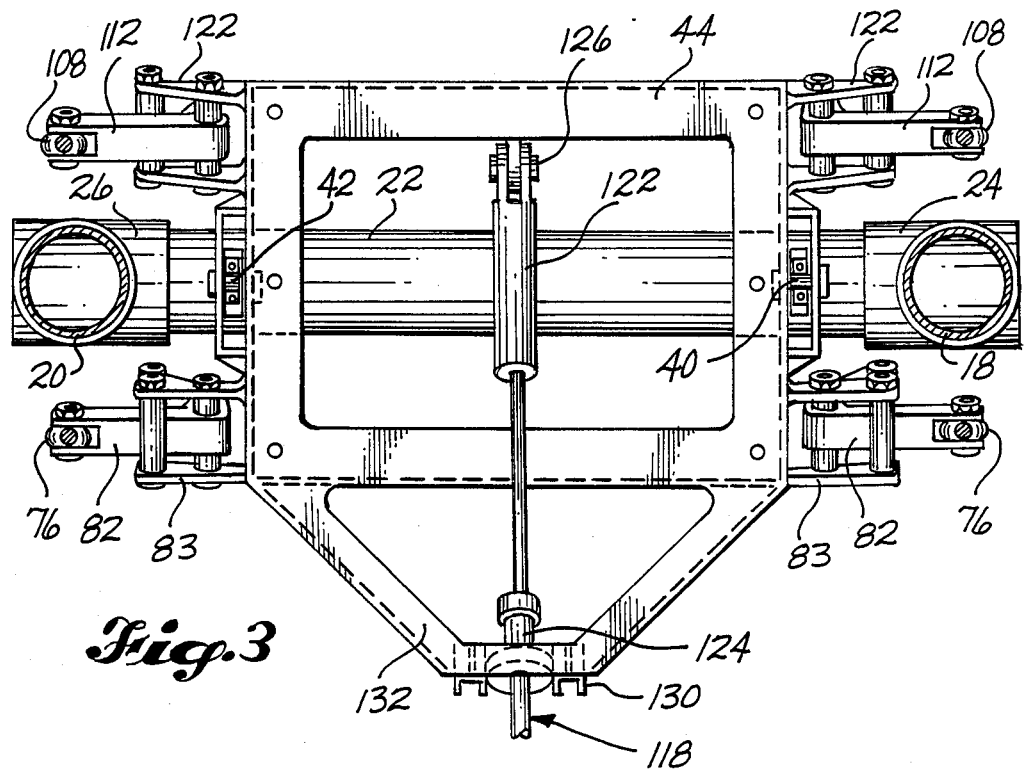
FIG. 3 is a sectional view of the lower portion of the assembly shown in FIGS. 1 and 2, and is taken looking downwardly along line 3—3 in FIG. 1.
Figure 7:
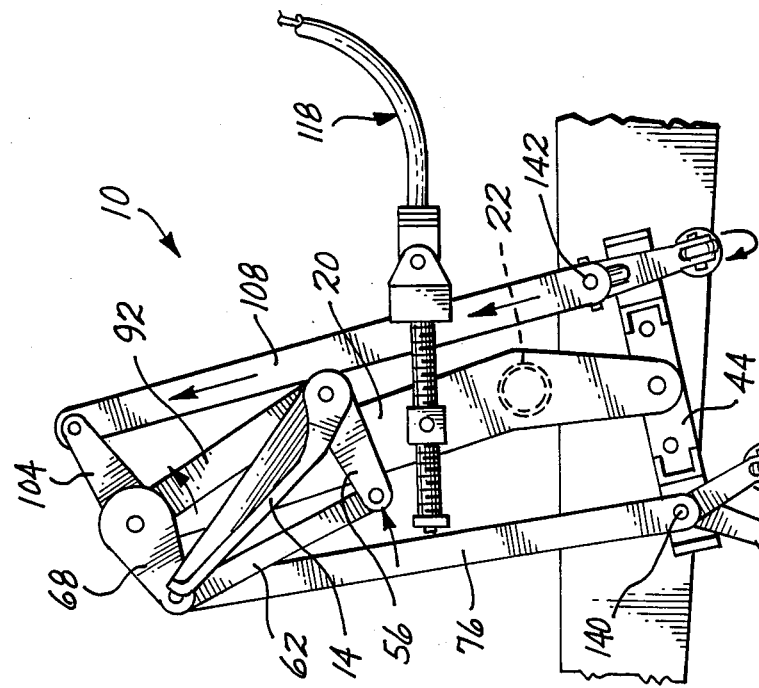
FIG. 7 is a view like FIGS. 4 and 6 but shows aft rudder pedal throw.
Figure 6:
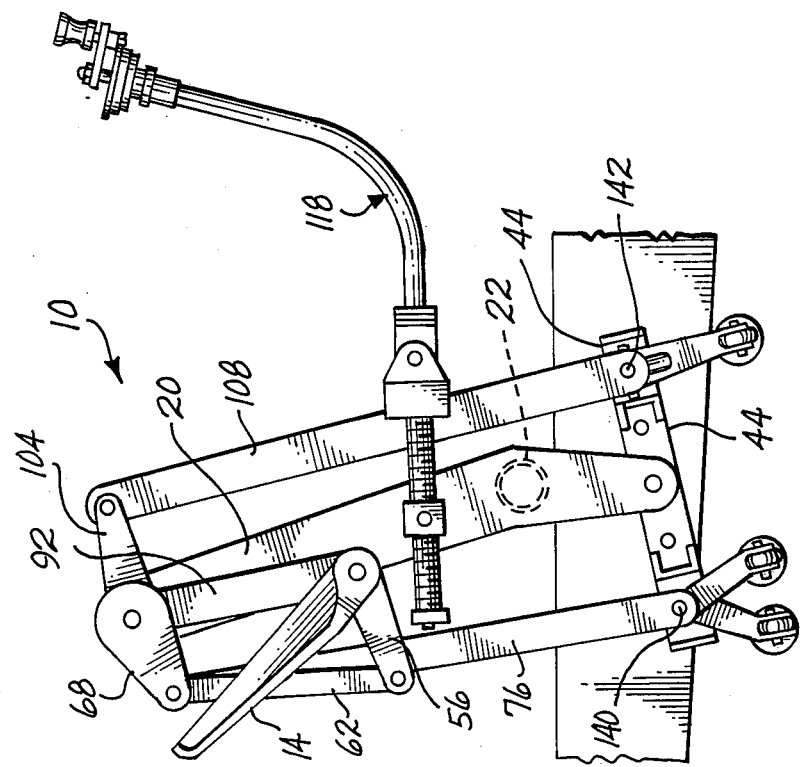
FIG. 6 is a view like FIG. 4, and shows the pedal throw position in a neutral position, but with the pedal rotated slightly for brake application.

Referring now to FIG. 2, therein is shown generally at 118 a manually adjustable cranking mechanism that is the preferable method for pivoting the assembly 10, to adjust the position of pedals 14, 16. The mechanism 118 includes a conventional jack screw assembly 119 which could be familiar to a person skilled in the art. Turning a crank handle 120 causes an end 122 of the jack screw assembly to move inwardly or outwardly relative to a screw assembly housing 124, depending on the direction of handle rotation. The end 122 is pivotally connected at 126 to a flange 128. This flange 128 is fixedly connected to the transversely extending leg 22 of the frame 12. Preferably, it is connected to leg 22 centrally between side legs 18, 20, the position of such connection being best seen in FIGS. 1 and 3. The screw assembly housing 124 is connected at 130 to a rearwardly extending portion 132 of the assembly mounting plate 44. This is best seen in FIG. 3. Thus, turning the crank handle 120 in one direction causes pivotal adjustment of the entire assembly 10, including pedals and linkage structure, so that the pedals 14, 16 are moved generally farther away from the normal seated position of the pilot. This is best shown in FIGS. 4-9.

Figure 24:
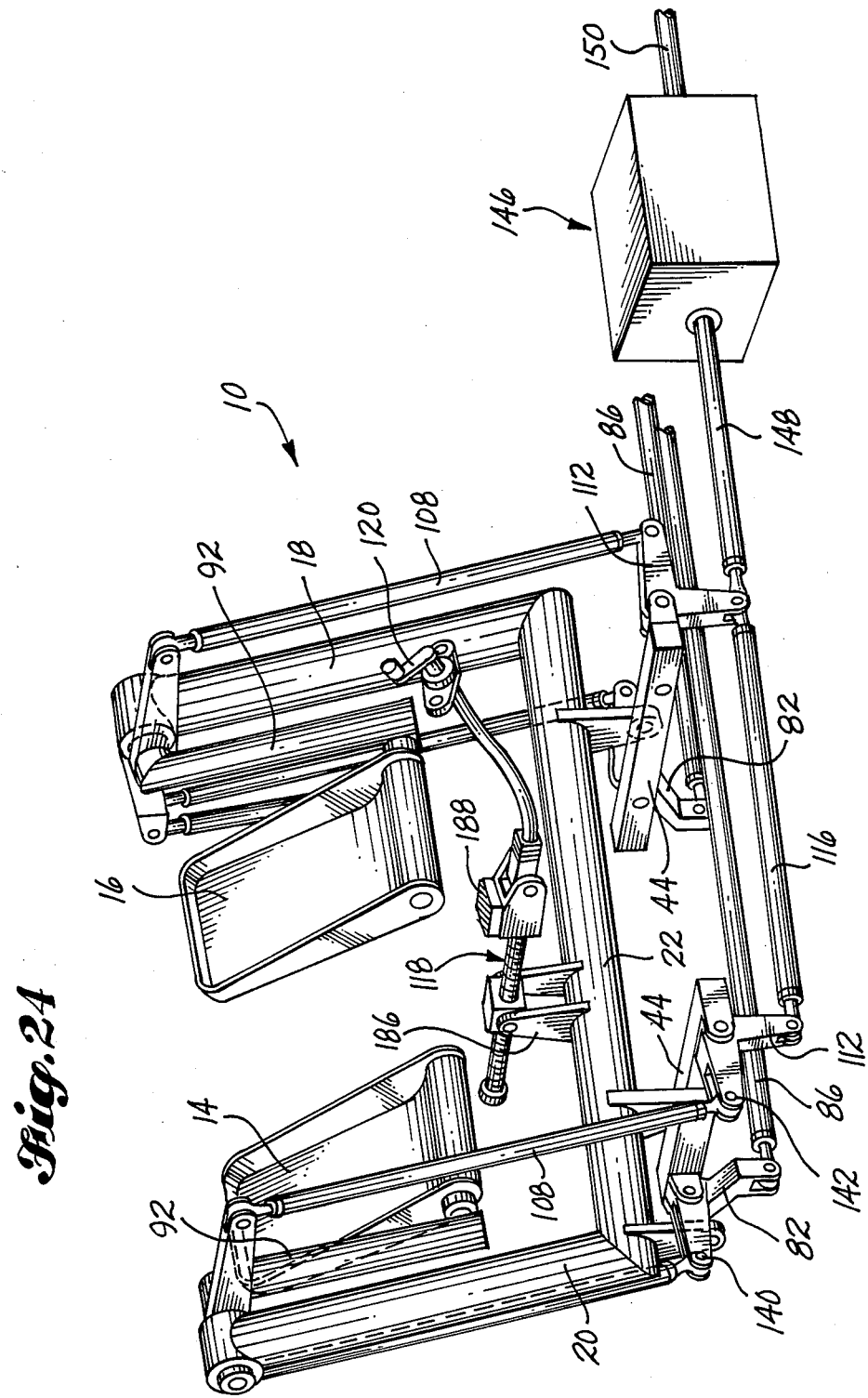
FIG. 24 is a pictorial view of a second embodiment of the invention.

FIGS. 4-9 schematically show the above adjustment for a second embodiment of the invention which is slightly different than the embodiment shown in FIG. 1. In this latter embodiment, which is shown in FIG. 24, the frame's transverse leg 22 is pivotally mounted above fixed frame structure 44 in the aircraft cockpit. Although this is not necessarily a preferred construction, nevertheless, its operation is functionally equivalent to the embodiment shown in FIG. 1. The jack screw mechanism 118 in this embodiment is connected directly to an upwardly extending flange 186 that is connected directly to the frame's transverse leg 22, and to any suitable fixed structure 188 in the cockpit.

Referring to FIG. 4, therein is shown the assembly 10 positioned midway between its forwardmost and aftmost or rearwardmost positions. This position would most likely be suitable for a pilot of average stature. The pedal 14 is thrown forwardly in the same manner as that which was shown and described in FIG. 10.

FIG. 5 shows the assembly 10 rotated to its forwardmost position which would be most suitable for tall pilots, and FIG. 8 shows the assembly rotated to its rearwardmost position which would be most suitable for short pilots.

It should be mentioned that when the assembly 10 is adjusted in the above-described manner the various above-described control rods and linkage structure and the U-frame all pivot together. The control rods 76, 108 which are used to transfer pedal movement directly to aircraft brake and rudder control, respectively, are pivotally connected at 140 and 142 to the assembly mounting plate 44 of the embodiment shown in FIG. 1, or FIG. 24. Thus, the loading forces borne by these rods become offset from the bell cranks 82, 112 shown in FIGS. 17 and 18 when the assembly is positioned either forward or aft of the assembly's midpoint position (see FIGS. 4, 6, 7 and 9). In FIG. 23, therein is schematically shown at 190 the slightly arcuate path the pedals travel in correspondence to the above pivotal adjustment of the assembly 10.

One assembly 10 like the assembly shown in FIG. 1, may be connected to another by means of brake interconnect rod 86 in FIG. 24, and a rudder feel and centering unit generally shown at 146 in FIGS. 19-22. One rudder control rod 148, which would be actuated or driven by the bell crank 112 shown in FIGS. 10 or 20, for example, would be connected to another control rod 150 connected to a separate assembly 10. The feel and centering unit would transfer pedal movement of one assembly to another so that a pilot operating his foot pedals would cause the copilot's food pedals to move correspondingly. After the pedals are released, the feel and centering unit 146 would cause the pedals to return to a normal or neutral position.

Preferably, the unit 146 includes a swing arm 152 pivotally connected at 154 to a fixed mounting bracket 156. This swing arm 152 is positioned between a pair of parallel centering arms 158, 160 whose ends are interconnected by a centering spring 162. The control rods 148, 150 are pivotally connected to the end 164 of the swing arm 152. Positioned approximately midway along the length of the swing arm 152 is a roller bearing 166. This roller bearing may push against either face 168, 170 (see FIG. 20) of opposing flanges 172, 174, wherein one flange each is fixedly connected to one of the centering arms 158, 160. Thus, when either the pilot or copilot activates the rudder controls of his or her respective assembly, one of the control rods 148, 150 is driven in one direction or another as shown in FIGS. 21 and 22. When the rudder controls are released, the spring 162 pulls the centering arms 158, 160 together into the position shown in FIG. 19, which brings the foot pedals of both assemblies into the neutral position.

As discussed above, an advantage to the present invention is that it may be constructed as a single unit and then installed in an aircraft cockpit, for example, and referring again to FIG. 23, therein is shown a seated pilot or copilot 180 whose feet 192 extend below conventional control panel structure 182. In the past, rudder, brake and nose landing gear steering control devices have been built or assembled piece-by-piece into this area. The present invention may be built as a single unit and installed as a single unit. In other words, once the assembly 10 (shown in FIG. 1) is built, it can be placed under the control panel 182 and the only connection that needs to be made is the connection of the assembly's mounting plate 44 to suitable fixed structure in the cockpit.

Having presented above a description of the best mode for carrying out the invention, it should be appreciated that the various structural details disclosed above are preferred but could be altered without departing from the spirit and scope of the invention. For this reason, any patent coverage lawfully granted on the instant invention should not be limited to the preceding description, but should be limited by the subjoined patent claims, wherein such claims are to be interpreted in accordance with the legally established doctrines of patent claim interpretation.

What is claimed is:

1. For use in an aircraft cockpit having a seat and a control panel, a device for controlling the aircraft's rudder, nose landing gear steering system and brakes, said device being positioned generally forwardly of said seat and underneath said control panel, and comprising:

a "U"-shaped frame having two spaced, generally upwardly extending legs interconnected by a tranversely extending leg;

a pair of foot-operated pedals, one each being mounted to one of said frame's upwardly extending legs;

an assembly mounted member, wherein said frame is pivotally mounted to said mounting member for rotation about a first horizontal axis;

adjustment means for pivotally moving said frame so that said pedals mounted thereto may be placed in a comfortable position for a seated aircraft operator;

linkage means for operationally connecting pedal throw and rotational movement of each of said pedals to aircraft rudder, nose landing gear steering and brake controls, said linkage means including a separate pair of elongated generally upwardly extending control rods for operationally interconnecting each pedal to said controls, wherein an upper end of a first rod of said pair is connected to said pedal in a manner so that said first rod translates either upwardly or downwardly depending on the direction of pedal throw, and an upper end of the second rod of said pair is connected to said pedal in a manner so that said second rod translates either upwardly or downwardly depending on the direction of pedal rotational movement, said linkage means further including a plurality of bell crank members, one for each control rod, wherein each bell crank member is pivotally connected to said assembly mounting member, for rotation about a second horizontal axis that is generally perpendicular to said first axis, and wherein a lower end of each control rod is connected to an outwardly projecting arm of said control rod's respective bell crank member, in a manner so that translational movement of said rod causes said bell crank member to pivot about said second axis, and further, said lower end of said control rod being connected to its respective bell crank member in a manner so that said control rod also pivots in the same direction as said frame in response to pivotal adjustment of said frame.

* * * * *

UNITED STATES PATENT AND TRADEMARK OFFICE
CERTIFICATE OF CORRECTION

PATENT NO. : 4,848,708

DATED : July 18, 1989

INVENTOR(S) : Gerald T. Farrell and Seiya Sakurai

It is certified that error appears in the above-identified patent and that said Letters Patent is hereby corrected as shown below:

Column 2, line 18, "eac" should be -- each --.

Column 7, line 1, "food" should be -- foot --.

Claim 1, line 12, "assembly mounted" should be -- assembly mounting --.

Signed and Sealed this

Third Day of April, 1990

Attest:

HARRY F. MANBECK, JR.

*Attesting Officer*   *Commissioner of Patents and Trademarks*